United States Patent
Burke et al.

(10) Patent No.: US 12,000,123 B2
(45) Date of Patent: *Jun. 4, 2024

(54) SYSTEM FOR MONITORING BACKFLOW PREVENTER CONDITION

(71) Applicant: Watts Regulator Co., North Andover, MA (US)

(72) Inventors: Joseph Michael Burke, Deerfield, NH (US); Kevin Simon, Somerville, MA (US); Ian David Baynes, Merrimac, MA (US)

(73) Assignee: Watts Regulator Co., North Andover, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/895,462

(22) Filed: Aug. 25, 2022

(65) Prior Publication Data

US 2022/0403632 A1    Dec. 22, 2022

Related U.S. Application Data

(63) Continuation of application No. 17/115,872, filed on Dec. 9, 2020, now Pat. No. 11,427,992.

(Continued)

(51) Int. Cl.
*E03B 7/07* (2006.01)
*E03C 1/10* (2006.01)

(52) U.S. Cl.
CPC ............ *E03B 7/077* (2013.01); *E03C 1/106* (2013.01)

(58) Field of Classification Search
CPC .... E03B 7/077; E03C 1/106; Y10T 137/7838; F16K 15/066; F16K 37/0041
See application file for complete search history.

(56) References Cited

U.S. PATENT DOCUMENTS

| | | | |
|---|---|---|---|
| 213,394 | A | 3/1879 | Cornwall |
| 623,418 | A | 4/1899 | O'Meara |

(Continued)

FOREIGN PATENT DOCUMENTS

| | | | |
|---|---|---|---|
| CN | 110081212 A | | 8/2019 |
| DE | 1925477 A1 | | 12/1970 |

(Continued)

OTHER PUBLICATIONS

Watts Regulator Co. 0887224 Series 909 Reduced Pressure Zone Assemblies Relief/Check Valve Kits 2½"-10", site visited Jul. 19, 2023; URL: https://controlscentral.com/tabid/63/ProductID/315241/watts-regulator-0887224-series-909-reduced-pressure-zone-assemblies-relief.aspx (Year: 2023).

(Continued)

*Primary Examiner* — Jessica Cahill
(74) *Attorney, Agent, or Firm* — Day Pitney LLP; George Chaclas; Anthony A. Kassas

(57) ABSTRACT

A backflow preventer including a body having an inlet for connection to an upstream portion of a plumbing system and an outlet for connection to a downstream portion of the plumbing system, a first check valve and a second check valve located in the body for preventing the reverse flow of water between the outlet and the inlet. An inlet pressure zone is positioned between the inlet and the first check valve, an outlet pressure zone is positioned between the outlet and the second check valve, and an intermediate pressure zone is positioned between the first and the second check valves. Position sensors sense the positions of the check valves, and pressure sensors sense the pressures in the zone. A controller in communication with the position sensors and the pressure sensors calculates the opening and closing pressures of the check valves.

16 Claims, 8 Drawing Sheets

Related U.S. Application Data

(60) Provisional application No. 62/946,130, filed on Dec. 10, 2019.

(56) References Cited

U.S. PATENT DOCUMENTS

| | | | |
|---|---|---|---|
| 953,940 A | 4/1910 | Beam |
| 2,310,586 A | 2/1943 | Lohman |
| 2,514,374 A | 7/1950 | Cooper |
| 2,827,921 A | 3/1958 | Sherman et al. |
| 3,173,439 A | 3/1965 | Griswold et al. |
| 3,189,037 A | 6/1965 | Modesto |
| 3,429,291 A | 2/1969 | Hoffman |
| 3,570,537 A | 3/1971 | Kelly |
| 3,817,278 A | 6/1974 | Elliott |
| 3,837,357 A | 9/1974 | Slaughter |
| 3,837,358 A | 9/1974 | Zieg et al. |
| 3,859,619 A | 1/1975 | Ishihara et al. |
| 3,896,850 A | 7/1975 | Waltrip |
| 3,905,382 A | 9/1975 | Waterston |
| 3,906,987 A | 9/1975 | Rushforth et al. |
| 3,996,962 A | 12/1976 | Sutherland |
| 4,014,284 A | 3/1977 | Read |
| 4,244,392 A | 1/1981 | Griswold |
| 4,276,897 A | 7/1981 | Griswold |
| 4,284,097 A | 8/1981 | Becker et al. |
| 4,416,211 A | 11/1983 | Hoffman |
| 4,452,272 A | 6/1984 | Griswold |
| 4,453,561 A | 6/1984 | Sands |
| 4,489,746 A | 12/1984 | Daghe et al. |
| 4,523,476 A | 6/1985 | Larner |
| 4,618,824 A | 10/1986 | Magee et al. |
| 4,667,697 A | 5/1987 | Crawford |
| 4,694,859 A | 9/1987 | Smith, III |
| 4,776,365 A | 10/1988 | Bathrick et al. |
| 4,777,979 A | 10/1988 | Twerdochlib |
| 4,920,802 A | 5/1990 | McMullin et al. |
| 4,945,940 A | 8/1990 | Stevens |
| 5,008,841 A | 4/1991 | McElroy |
| 5,024,469 A | 6/1991 | Aitken et al. |
| 5,072,753 A | 12/1991 | Ackroyd |
| 5,125,429 A | 6/1992 | Ackroyd et al. |
| 5,236,009 A | 8/1993 | Ackroyd |
| 5,299,718 A | 4/1994 | Shwery |
| 5,404,905 A | 4/1995 | Lauria |
| 5,425,393 A | 6/1995 | Everett |
| 5,452,974 A | 9/1995 | Binns |
| 5,520,367 A | 5/1996 | Stowers |
| 5,551,473 A | 9/1996 | Lin et al. |
| 5,566,704 A | 10/1996 | Ackroyd et al. |
| 5,584,315 A | 12/1996 | Powell |
| 5,586,571 A | 12/1996 | Guillermo |
| 5,669,405 A | 9/1997 | Engelmann |
| 5,709,240 A | 1/1998 | Martin et al. |
| 5,711,341 A | 1/1998 | Funderburk et al. |
| 5,713,240 A | 2/1998 | Engelmann |
| 5,794,655 A | 8/1998 | Funderburk et al. |
| 5,901,735 A | 5/1999 | Breda |
| 5,918,623 A | 7/1999 | Hidessen |
| 5,947,152 A | 9/1999 | Martin et al. |
| 5,950,653 A | 9/1999 | Folsom |
| 5,992,441 A | 11/1999 | Enge et al. |
| 6,021,805 A | 2/2000 | Horne et al. |
| 6,123,095 A | 9/2000 | Kersten et al. |
| 6,155,291 A | 12/2000 | Powell |
| 6,170,510 B1 | 1/2001 | King et al. |
| 6,196,246 B1 | 3/2001 | Folsom |
| 6,343,618 B1 | 2/2002 | Britt et al. |
| 6,349,736 B1 | 2/2002 | Dunmire |
| 6,374,849 B1 | 4/2002 | Howell |
| 6,378,550 B1 | 4/2002 | Herndon et al. |
| 6,443,184 B1 | 9/2002 | Funderburk |
| 6,471,249 B1 | 10/2002 | Lewis |
| 6,513,543 B1 | 2/2003 | Noll et al. |
| 6,546,946 B2 | 4/2003 | Dunmire |
| 6,581,626 B2 | 6/2003 | Noll et al. |
| 6,659,126 B2 | 12/2003 | Dunmire et al. |
| 6,675,110 B2 * | 1/2004 | Engelmann ......... F16K 37/0091 702/45 |
| 7,051,763 B2 | 5/2006 | Heren |
| 7,114,418 B1 | 10/2006 | Allen |
| 7,434,593 B2 | 10/2008 | Noll et al. |
| 7,506,395 B2 | 3/2009 | Eldridge |
| 7,784,483 B2 | 8/2010 | Grable et al. |
| 7,934,515 B1 | 5/2011 | Towsley et al. |
| 8,220,839 B2 | 7/2012 | Hall |
| 8,997,772 B2 | 4/2015 | Noll et al. |
| 9,091,360 B2 | 7/2015 | Frahm |
| 9,546,475 B2 | 1/2017 | Lu |
| 9,899,819 B1 | 2/2018 | Holloway |
| 9,995,605 B2 | 6/2018 | Konno et al. |
| 10,132,425 B2 * | 11/2018 | Di Monte, Sr. ....... F16K 15/042 |
| D876,585 S | 2/2020 | Li et al. |
| 10,561,874 B2 * | 2/2020 | Williams ............... F16K 7/126 |
| D886,236 S | 6/2020 | Pfund et al. |
| 10,719,904 B2 | 7/2020 | Yasumuro et al. |
| D908,191 S | 1/2021 | Li et al. |
| 10,883,893 B2 * | 1/2021 | Shaw, Jr. .............. G01M 3/2876 |
| 10,914,412 B2 | 2/2021 | Doughty et al. |
| 10,962,143 B2 | 3/2021 | Cis et al. |
| D917,013 S | 4/2021 | Pfund et al. |
| D919,048 S | 5/2021 | Li et al. |
| D919,049 S | 5/2021 | Li et al. |
| D928,916 S | 8/2021 | Shim |
| 11,137,082 B2 | 10/2021 | Okuno et al. |
| D941,426 S | 1/2022 | Downing et al. |
| D957,587 S | 7/2022 | Downie et al. |
| D958,937 S | 7/2022 | Pfund et al. |
| 2002/0043282 A1 * | 4/2002 | Horne ..................... E03C 1/108 137/218 |
| 2002/0078801 A1 | 6/2002 | Persechino |
| 2003/0000577 A1 | 1/2003 | Noll et al. |
| 2003/0168105 A1 | 9/2003 | Funderburk |
| 2004/0045604 A1 | 3/2004 | Dunmire et al. |
| 2004/0107993 A1 | 6/2004 | Stephens |
| 2005/0092364 A1 | 5/2005 | Furuya et al. |
| 2005/0199291 A1 | 9/2005 | Price et al. |
| 2006/0076062 A1 | 4/2006 | Andersson |
| 2006/0196542 A1 | 9/2006 | Yen |
| 2007/0181191 A1 | 8/2007 | Wittig et al. |
| 2007/0193633 A1 | 8/2007 | Howell et al. |
| 2007/0204916 A1 | 9/2007 | Clayton et al. |
| 2007/0204917 A1 | 9/2007 | Clayton et al. |
| 2007/0240765 A1 | 10/2007 | Katzman et al. |
| 2008/0145739 A1 | 6/2008 | Adams et al. |
| 2008/0289567 A1 | 11/2008 | Gordon |
| 2009/0136935 A1 | 5/2009 | Petersen |
| 2009/0194719 A1 | 8/2009 | Mulligan |
| 2011/0067225 A1 | 3/2011 | Bassaco |
| 2011/0309076 A1 | 12/2011 | Liebenberg et al. |
| 2012/0248759 A1 | 10/2012 | Feith |
| 2013/0026743 A1 | 1/2013 | Baca |
| 2013/0255452 A1 | 10/2013 | Kovach |
| 2014/0109986 A1 | 4/2014 | Cordes |
| 2015/0260310 A1 * | 9/2015 | Bahalul ............... F16K 37/0041 137/557 |
| 2017/0023141 A1 | 1/2017 | Andersson |
| 2017/0234441 A1 | 8/2017 | Fuller et al. |
| 2018/0156488 A1 | 6/2018 | Evans et al. |
| 2019/0043157 A1 | 2/2019 | Yasumuro et al. |
| 2019/0136935 A1 | 5/2019 | Hulstein et al. |
| 2019/0162341 A1 | 5/2019 | Chiproot |
| 2019/0271428 A1 | 9/2019 | O'Connor et al. |
| 2019/0323618 A1 | 10/2019 | Fletcher et al. |
| 2020/0141612 A1 | 5/2020 | Thibodeaux |
| 2020/0370677 A1 | 11/2020 | Mendez |
| 2021/0172157 A1 | 6/2021 | Burke et al. |
| 2021/0230850 A1 | 7/2021 | Bouchard et al. |
| 2021/0332898 A1 | 10/2021 | Cellemme |
| 2022/0049487 A1 | 2/2022 | Bouchard et al. |
| 2022/0049786 A1 | 2/2022 | Doughty |
| 2022/0412474 A1 | 12/2022 | Bouchard et al. |
| 2023/0228067 A1 | 7/2023 | Bouchard |

(56) References Cited

U.S. PATENT DOCUMENTS

FOREIGN PATENT DOCUMENTS

| DE | 8525261 | U1 | 11/1985 |
|---|---|---|---|
| DE | 202014102568 | U1 | 9/2015 |
| EP | 1521004 | A1 | 4/2005 |
| EP | 3434833 | A1 | 1/2019 |
| EP | 3832183 | A1 | 6/2021 |
| FR | 2928750 | A1 | 9/2009 |
| GB | 1231579 | | 11/1967 |
| JP | 2002-013629 | A | 7/2002 |
| WO | 2003060459 | A1 | 7/2003 |
| WO | 2020023584 | A1 | 1/2020 |

OTHER PUBLICATIONS

AU Examination Report corresponding to Application No. 2021328510, dated Sep. 19, 2023, 3 pages.
Ames Fire & Waterworks, division of Watts Industries, F-A-Spools/Flanges (2001) 4 pages.
Apollo Valves PVB4A Series Installation, Operation and Maintenance Manual for Model PVB4A ½"-2" Pressure Vacuum Breaker Backflow Preventer, dated Jan. 11, 2012, 12 pages.
Apollo Valves PVB4A Series Installation, Operation, and Maintenance Manual, copyright May 2009, 9 pages.
Conbraco BFMMPVB Maintenance Manual for Series 4V-500 ½"-2" Pressure Type Vacuum Breaker (Apr. 2002) Conbraco Industries, Inc., Matthews, North Carolina 28106, 6 pages.
Lead Free Master Series LF870V product specifications pages, ES-F-LF-870V 1826 (2018) 4 pages.
Extended European Search Report received for European Patent Application No. 20211811.3, dated May 4, 2021, 8 pages.
Watt TK-99E Backflow Preventer Test Kit Product Specifications and Test Information, IS-TK99E 0829 (2009) 4 pages.
Watts, "Double Check Valve Assembly Backflow Preventers, Bronze," Article 1 (2021) 6 pages.
Watts, "Reduced Pressure Zone Assembly Backflow Preventers, Bronze Body, Sizes ¼-2 In," Article 1 (2021) 16 pages.
Watts, S-RetroFit-Simple (2017) 2 pages.
Wilkins Company, Model 375/475MS Series, Installation, Maintenance and Instruction Sheet (2006) 1 page.
European Search Report for European Patent Application No. 20192133.5 dated Feb. 1, 2021, 9 pages.
Watts Regulator Co., Watts ACV 113-6RFP Flood Protection Shutdown Valve for health Hazard Applications (2020) 4 pages.
Watts Water Technologies Company, Installation, Maintenance & repair Series 909, LF909, 909RPDA, LF909RPDA (2016) 8 pages.
Zurn Wilkins 300AR Series, Backflow Preventer Order Form No. 480-060 (Apr. 2017) 2 pages.
International Search Report and Written Opinion issued in corresponding International patent Application No. PCT/US2021/046101, dated Nov. 22, 2021, 8 pages.
International Search report and Written Opinion issued in corresponding International patent Application No. PCT/US2021/046208, dated Dec. 1, 2021, 7 pages.
International Search Report and Written Opinion issued in corresponding International Patent Application No. PCT/US2021/062395, dated Feb. 23, 2022, 7 pages.
Watts Water Company, Series 909RPDA for Health Hazard Applications (2016) 4 pages.
Wilkins Model 420 XL Lead-Free pressure Vacuum Breakers ½", ¾", and 1" (date unknown), 2 pages.
Apollo Valves, Apollo backflow preventer in-line "R" retrofit series (dated unknown) 2 pages.
EESR/Miscellaneous Communication issued in European patent application No. 20211811.3, dated May 4, 2021, 8 pages.
Watts Water Technologies Company Brochure ES LF800M4QT for Health Hazard Applications Lead Free Series LF8M4QT Anti-Siphon Vacuum Breakers Sizes ½"-2", copyright 2013, 4 pages.

\* cited by examiner

SYSTEM FOR MONITORING BACKFLOW PREVENTER CONDITION

CROSS-REFERENCE TO RELATED APPLICATION

This application claims Priority to U.S. patent application Ser. No. 17/115,872, filed on Dec. 9, 2020 and issued as U.S. patent Ser. No. 11/427,992 on Aug. 30, 2022, which claimed the benefit of U.S. Provisional Patent Application No. 62/946,130, filed Dec. 10, 2019, each of Which is incorporated herein by reference.

FIELD OF THE DISCLOSURE

The subject disclosure relates to backflow prevention valves and assemblies, and more particularly to remote and/or continuous digital monitoring of the condition of the check valves in a backflow prevention system.

BACKGROUND

In many water systems, a backflow prevention valve and assembly, sometimes referred to as a backflow preventer (BFP), assures that a fluid, and any solids therein, flows in only a desired direction, i.e., a forward direction. As back siphonage, or backflow, may cause contamination and health problems, a BFP prevents flow in an undesired direction, i.e., a backward or reverse direction. For example, backflow prevention valves and assemblies are installed in buildings, such as residential homes, and commercial buildings and factories, to protect public water supplies by preventing the reverse flow of contaminated water back into the public water supply.

Referring now to FIGS. 1a and 1b, a backflow preventer (BFP) 100 according to the prior art includes a body 102 having an inlet 104 and an outlet 106 where the forward flow direction F is shown. It is noted that many different configurations of backflow prevention assemblies are possible, each being different in configuration, and the BFP 100 presented here is an example for illustration.

As shown in sectional view of FIG. 1b, the BFP 100 includes a first check assembly 110a and a second check assembly 110b. The exemplary embodiment shown also includes a relief valve assembly 108 located between the check assemblies 110a, 110b to allow water to drain from between the check assemblies under certain circumstances. For example, the relief valve assembly 108 may open to release water if the second check assembly 110b should fail to prevent backflow.

Owing to the fact that backflow preventers (BFPs) are important for water safety, BFPs are typically manually tested on an annual basis to assure proper operating conditions. Specifically, fluid pressure measurements are taken at specified locations in the BFP 100 using a manual testing kit 111, an example of which is shown in FIG. 1a. To facilitate these pressure measurements, the BFP 100 includes a number of Test Cocks (TCs) 112a-c. The TCs 112a-c extend through the body 102 of the BFP 100.

Accordingly, a first TC 112a measures the pressure coming into the BFP 100; a second TC 112b measures the pressure just after the first check assembly 110a; and a third TC 112c measures the pressure right after the second check assembly 110b. Again, because of the public safety importance of the BFP, it is often a certified BFP Technician that conducts the testing on site to confirm that the BFP is in compliance with national standards bodies' requirements. The testing involves connecting the testing kit 111 to the TCs 112a-c and executing various procedures to ensure that the BFP 100 is operating properly.

SUMMARY

In view of the above, what is needed is a system for monitoring the status of a BFP to ensure proper operation and/or simplification of the testing process. The subject technology relates to a digital monitoring system that can remotely and/or continuously monitor the condition of the check assemblies in a backflow prevention system.

One embodiment of the subject technology is directed to a backflow preventer including a body having an inlet for connection to an upstream portion of a plumbing system and an outlet for connection to a downstream portion of the plumbing system. A first check valve and a second check valve are located in the body for preventing the reverse flow of water between the outlet and the inlet. An inlet pressure zone is positioned between the inlet and the first check valve, an outlet pressure zone is positioned between the outlet and the second check valve, and an intermediate pressure zone is positioned between the first and the second check valves. Position sensors sense the positions of the check valves. In particular, the position sensors detect when the check valves are closed. Pressure sensors sense the pressures in the zones, and a controller is in communication with the position sensors and the pressure sensors and calculates the opening and closing pressures of the check valves.

According to one exemplary embodiment, the first check valve includes a valve seat and a slidably mounted valve disc for sealingly engaging the valve seat to close the first check valve. The first position sensor is a contact pressure sensor including a sensor lead having a piezoresistive composite ring sandwiched between two current collector rings, the sensor lead being coupled to the valve seat so that upon closing, force from the valve disc transmitted to the sensor lead actuates the first position sensor.

BRIEF DESCRIPTION OF THE DRAWINGS

Various aspects of the disclosure are discussed herein with reference to the accompanying Figures. It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. For purposes of clarity, however, not every component may be labeled in every drawing. The Figures are provided for the purposes of illustration and explanation and are not intended as a definition of the limits of the disclosure.

FIG. 1b is a sectional view of the BFP of FIG. 1a.

DETAILED DESCRIPTION

Figure 1A:
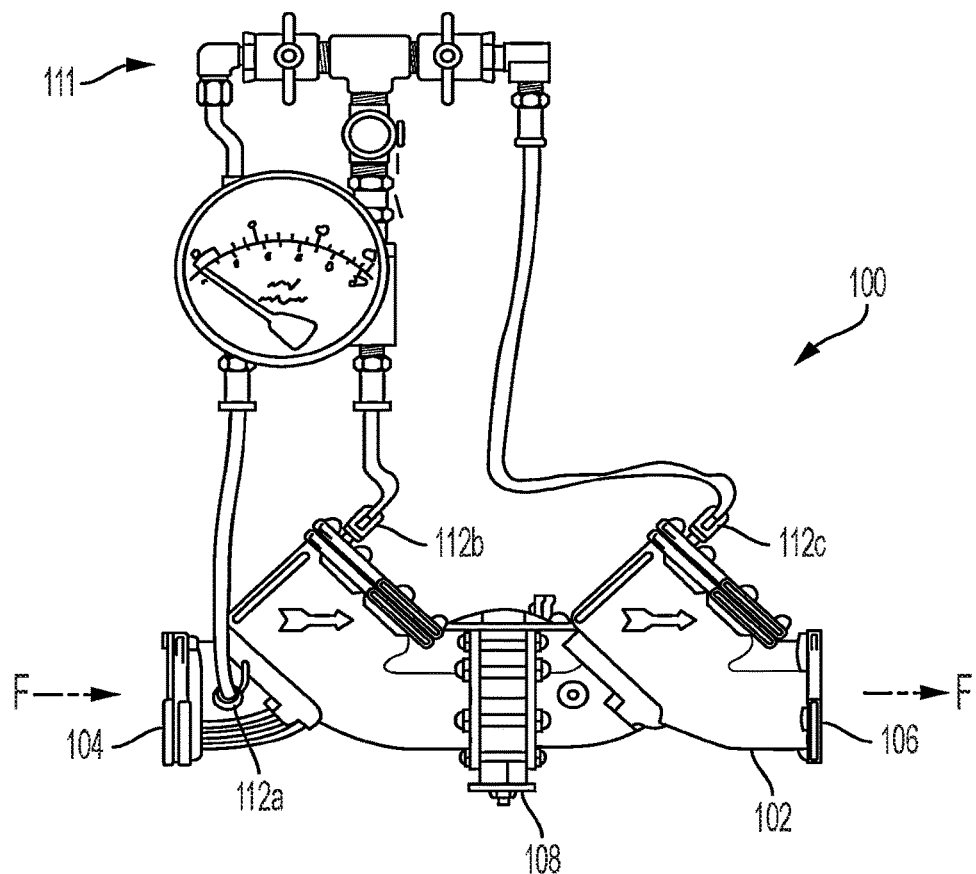
FIG. 1a shows a backflow preventer (BFP) and test kit in accordance with the prior art.

The subject technology provides condition monitoring for backflow preventers. The advantages, and other features of the technology disclosed herein, will become more readily apparent to those having ordinary skill in the art from the following detailed description of certain exemplary embodiments taken in combination with the drawings and wherein like reference numerals identify similar structural elements. It should be noted that directional indications such as vertical, horizontal, upward, downward, right, left and the like, are used with respect to the figures and not meant in a limiting manner.

Figure 2:
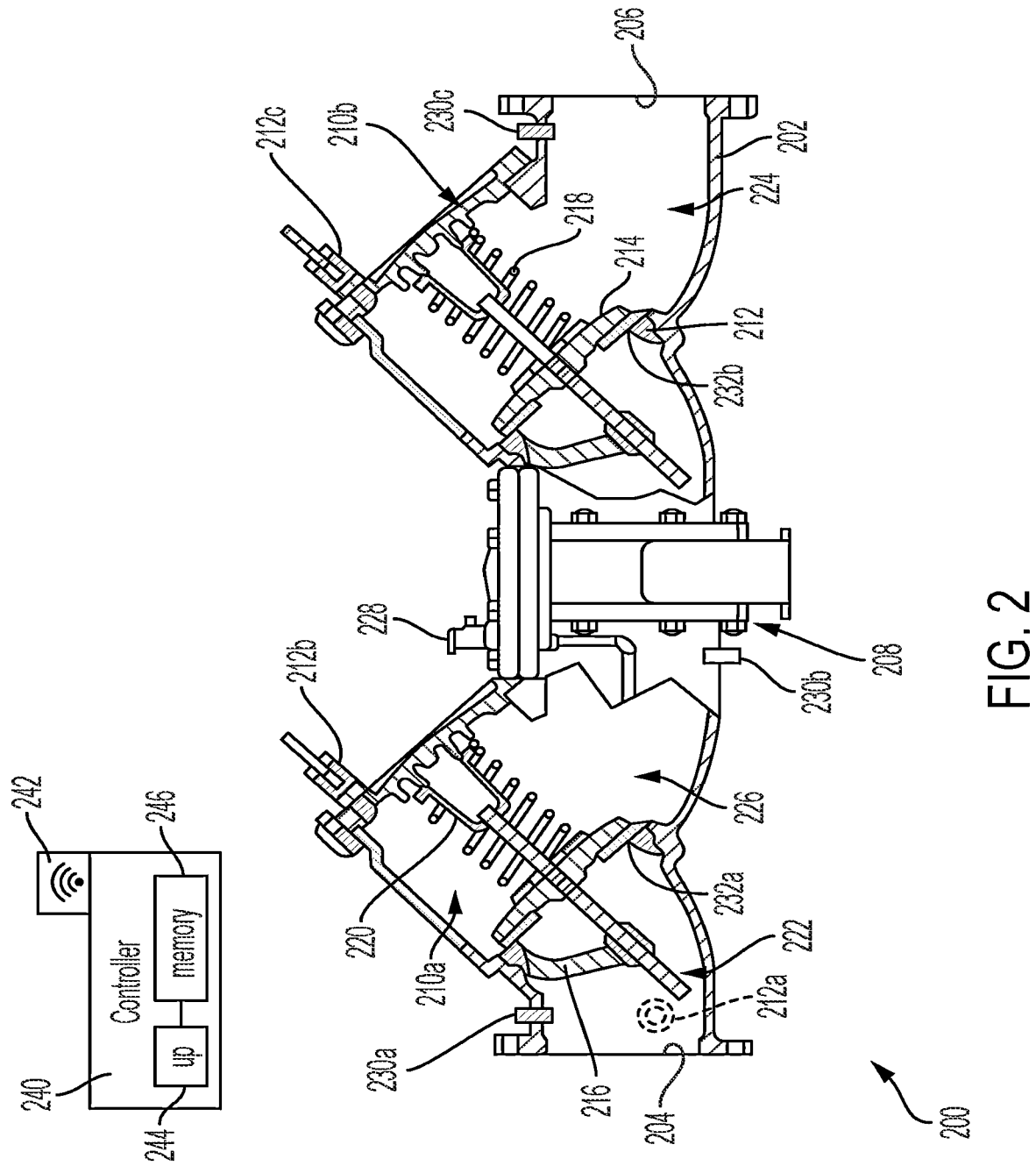
FIG. 2 shows a cross-sectional view of a BFP system in accordance with the subject technology.

Referring now to FIG. 2, a cross section of a backflow preventer (BFP) system 200 is shown. The BFP system 200 comprises a body 202 forming an inlet 204 and an outlet 206 for coupling into a fluidic network (not shown) to prevent backflow from the outlet 206 to the inlet 202. The fluidic network may for example be a plumbing system located in a residential or commercial building. A first check valve assembly 210a couples to the inlet 204 with a second check valve assembly 210b coupled to the outlet 206. For efficient manufacturing, the first and second check valves assemblies 210a, 210b may be identical but it is not necessary. The check valve assemblies 210a, 210b shown are illustrative and it is understood that many different check valve assemblies would be well-suited to the subject disclosure. For example, the check valve assemblies may include poppet type check valves or swing type check valves.

In the exemplary embodiment shown, a relief valve assembly 208 extends between the two check valve assemblies 210a, 210b. Under certain conditions, the relief valve assembly 208 may open to allow water to drain from between the check valve assemblies 210a, 210b. However, it should be understood that the subject technology can be applied to a BFP that does not include a relief valve assembly.

Each check valve assembly 210a includes a valve seat 212. A valve disc 214 selectively opens and closes the fluid flow path of the valve seat 212. In the exemplary embodiment shown, the valve disc 214 is slidably mounted on a valve guide 216. A spring 218 extends between a spring mount 220 and the valve disc 214 for biasing the valve disc 214 to a normally closed position. To move to the open position, pressure at the inlet 204 must overcome the force of the spring 218. The second check valve assembly 210b works similarly, but not necessarily. For simplicity and clarity, the second check valve assembly 210b has the same reference numbers on the similar components and not further described herein.

Still referring to FIG. 2, the check valve assemblies 210a, 210b create three distinct pressure zones. An inlet pressure zone 222 is located in the body 202 between the inlet 204 and the first check valve assembly 210a, an outlet pressure zone 224 is between the second check valve assembly 210b and the outlet 206, and an intermediate pressure zone 226 is located in the body 202 between the check valve assemblies 210a, 210b.

The first check valve assembly 210a includes a test cock (TC) 212a located before its valve seat 212 and a TC 212b after its valve seat 212, while the second check valve assembly 210b includes a TC 212c located after its valve seat 212. The first TC 212a can be used to manually measure pressure in the inlet pressure zone 222, the second TC 212b can be used to measure pressure in the intermediate pressure zone 226, and the third TC 212c can be used to measure pressure in the outlet pressure zone 224.

Pressure sensors 230a-c are mounted in the body 202 for generating signals indicative of each zone 222, 224, 226. The pressure sensors 230a-c can be easily mounted external to the body 202 such as by incorporating the pressure sensors in the test cocks in retrofit situations or by incorporation into the body 202 in new or old designs. The pressure sensors 230a-c may be hard wired or provided with a battery and communicate wirelessly. The pressure sensors 230a-c may be powered using energy harvesting methods that take advantage of the water flowing throw the body 202. The first pressure sensor 230a measures pressure in the inlet pressure zone 222, the second pressure sensor 230b measure pressure in the intermediate pressure zone 226, and the pressure sensor 230c measures pressure in the outlet pressure zone 224.

A controller 240 receives the signals from the pressure sensors 230a-c. Preferably, the controller 240 includes a wireless module 242 not only for communicating with the pressure sensors 230a-c but connecting with networks, whether private or public. As a result, the controller 240 can send information such as status, warning and error conditions to smart devices such as desktop computers, smart phones, tablets and other monitoring equipment. The controller 240 also includes a processor 244 and memory 246 for storing data and running instructions to accomplish the activity envisioned in the subject disclosure.

The controller 240 also communicates with position sensors 232a, 232b on each check valve assembly 210a, 210b. The position sensors 232a, 232b generate signals indicating whether the respective check valve assembly 210a, 210b is open or closed, i.e., the position of the valve disc 214 with respect to the valve seat 212. As many types of contact, pressure and position sensors are practical for use in the subject technology, the position sensors are shown somewhat schematically. Similar to the pressure sensors 230a-c, the position sensors 232a, 232b may be placed in various locations and utilize various technology now known and later developed.

For example, the position sensors 232a, 232b may be: 1) a rubber contact switch embedded in rubber placed in parallel to the valve seat 212 and the valve disc 214; 2) sensing the state of an electro-active polymer, piezoelectric element, or capacitor embedded in the valve disc 214; 3) non-contact position sensing such as eddy current, a hall effect sensor, or capacitive sensing; 4) contact sensing such as placing a sensor under the valve seat 212 such that the sealing force passes through the sensor; 5) a leaf spring which gently connects a circuit involving the seat 212 and the disc 214, but deforms in the presence of flow such that there is no electrical connection; and 6) measuring strain in the valve disc 214 and/or the seat 212 as a result of closure. Further, one or more position or contact sensors may be placed on the valve seat 212, the valve disc 214, in between the valve seat 212 and the valve disc 214, or some combination thereof and the like to determine the position of the respective check valve assembly 210a, 210b.

In operation when the BFP system 200 is functioning properly and no problems are present in the fluidic network, and the BFP system 200 is in a static condition with the state of the check valve assemblies 210a, 210b closed, then no fluid flows through the system 1000. The pressure in the intermediate pressure zone 226, sensed by pressure sensor 230b, is theoretically constant. Similarly, the pressures in the inlet and outlet pressure zones 222, 224, sensed by the pressure sensors 230a, 230c, should also be relatively constant. The controller 240 can monitor and store the pressure readings and, preferably generate graphs for display and review with supporting data.

By selection of the force of the springs 218 and other parameters, the pressure required to open one or both of the check valve assemblies 210a, 210b (e.g., the cracking pressure) is set. Cracking pressure is not only an important design consideration but typically a regulated value for BFP check valve performance. Further, it is undesirable for the check valve assemblies 210a, 210b to leak. For proper performance, when closed, the check valve assemblies 210a, 210b should maintain a complete seal. The cracking pressure and improper pressure changes due to leakage can be tracked by the controller 240 to insure proper operation.

To determine the cracking pressure of the first check valve assembly 210a, the controller 240 continuously monitors the pressure difference between the inlet pressure zone 222 and the intermediate pressure zone 226 using the pressure sensors 230a, 230b. The controller 240 also monitors the signals from the position sensor 232a to determine when the check valve assembly 210a opens and closes. When the first check valve assembly 210a opens or closes, the controller 240 can determine the respective cracking pressure value and track the cracking pressure over time and multiple openings and closings. In short, measuring the pressure difference between the inlet pressure zone 222 and the intermediate pressure zone 226 at the instant that the check valve assembly 210a opens provides direct continuous monitoring of that cracking pressure value over time. Likewise, the pressure difference between the outlet pressure zone 228 and the intermediate pressure zone 226 at the instant that the second check valve assembly 210b opens provides direct continuous monitoring of the cracking pressure value of the second check valve assembly 210b over time.

If the cracking pressure is not in accordance with specifications or regulations, the controller 240 can generate and send a specific related error signal with the underlying data immediately for prompt investigation and correction. The controller 240 can compare the cracking pressure to the relevant history or a set value so that deviation by a predetermined value is defined as a warning or error condition as the case may be. For example, a deviation of 2 psi down from standard can be an error whereas 1.5 to 2 psi can generate only a warning. The controller can also note trends in the readings that may indicate physical inspection, service and/or replacement is proper.

Furthermore, if both check valve assemblies 210a, 210b are closed, the pressure in the intermediate pressure zone 226 should be constant. If there are pressure changes or fluctuations in the intermediate pressure zone 226 when the check valve assemblies 210a, 210b are closed, this is an indication that leaking can be present. For example, a sudden rise in the pressure reading of the intermediate pressure zone 226 while both check valve assemblies 210a, 210b are closed could be caused by one of the check valve assemblies 210a, 210b leaking. Again, the controller 240 can generate and send a related error signal immediately for prompt investigation and correction.

The foregoing subject technology has a number of benefits over the known approaches, including, but not limited to automating the collection of data so that the system 1000 is operationally compliant for a larger amount of time. Ideally, periodic manual testing can be reduced or even eliminated. If manual testing is reduced or eliminated, it is envisioned that BFPs could be fabricated without the required manual testing components (e.g., manual shutoff valves, test cocks etc.) so that size, cost and complexity can be reduced. By having automated monitoring, the cost of manual inspection and testing by a certified professional is reduced. Also, prompt detection and review of warning and error conditions helps to reduce the likelihood of a backflow event. As can be seen, the capital costs, the cost of ownership, and the safety of the water distribution system are all improved by the subject technology.

Generally, any sensor technology now known or later developed can be used in the subject technology for determining the position of the check valves. Preferably, the position sensor robustly differentiates between all closings and even slight openings. Additionally, the position sensor should not interfere with normal operation or performance so that the check valves still seal without interference.

Figure 3:
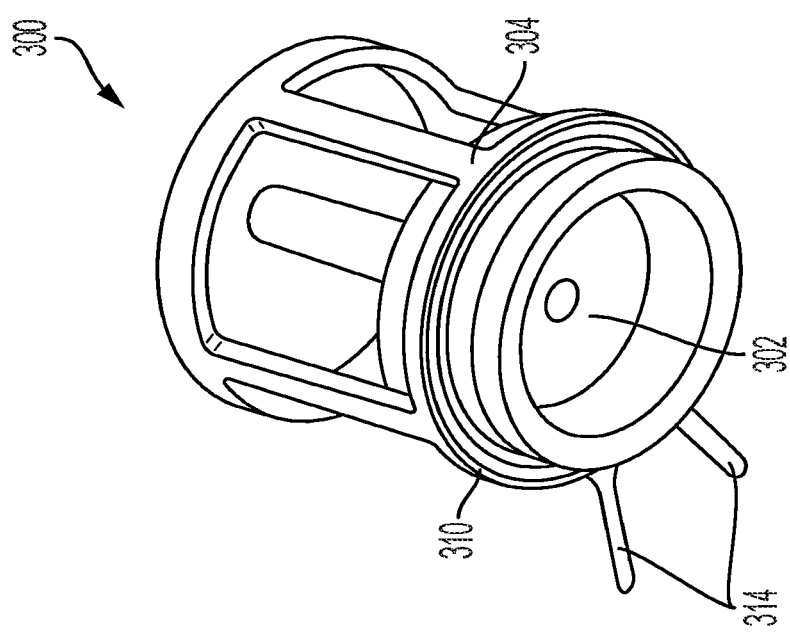
FIG. 3 is an isolated bottom perspective view of a check valve disc and seat assembly with a contact pressure sensor in accordance with the subject technology.

Referring now to FIG. 3, an isolated bottom perspective view of a check valve disc and seat assembly 300 with a contact pressure sensor 310 in accordance with the subject technology is shown. The assembly 300 includes a disc 302 that sealingly mates with a seat 304. A contact sensor 310 is coupled to the assembly 300 for generating a signal based upon closing pressure between the disc 302 and seat 304. In other words, the contact sensor 310 is positioned so that when a valve using the assembly 300 is closed, the sensor 310 is actively verifying the valve position. The sensor 310 can be placed behind the valve disc 302 or formed in the valve disc 302 or valve seat 304. As shown, the sensor 310 is placed under the valve seat 304 so that upon the disc 302 closing against the seat 304, the pressure is transmitted to the sensor 310.

Figure 4:
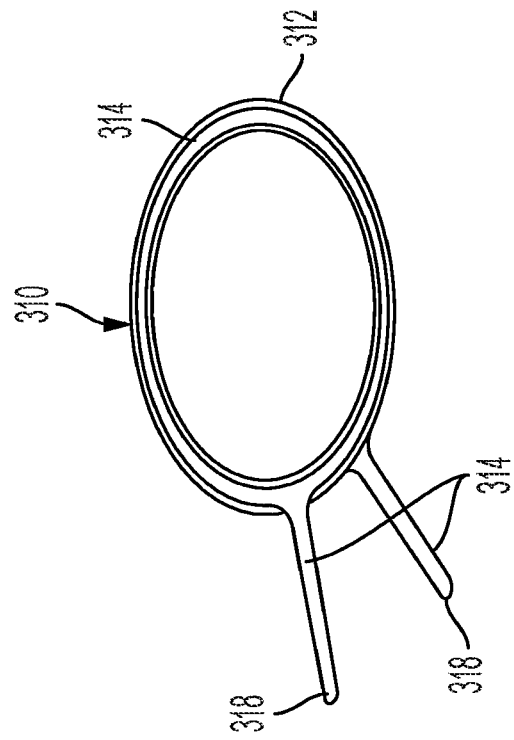
FIG. 4 is a perspective view of a piezoresistive composite sensor trace for a pressure sensor in accordance with the subject technology.

Referring now to FIG. 4, a perspective view of a piezoresistive composite sensor trace 312 for a pressure sensor 310 in accordance with the subject technology is shown. The trace 312 includes a piezoresistive material that changes resistance in response to pressure. In the embodiment shown, the trace 312 is a polyolefin and carbon black composite 316 sandwiched between two copper current collectors 314 and then laminated. The ends 318 of the current collectors 314 serve as leads to additional components not shown. When positioned properly, the trace 312 will generate an electrical signal indicative of pressure being applied thereto.

Figure 5:
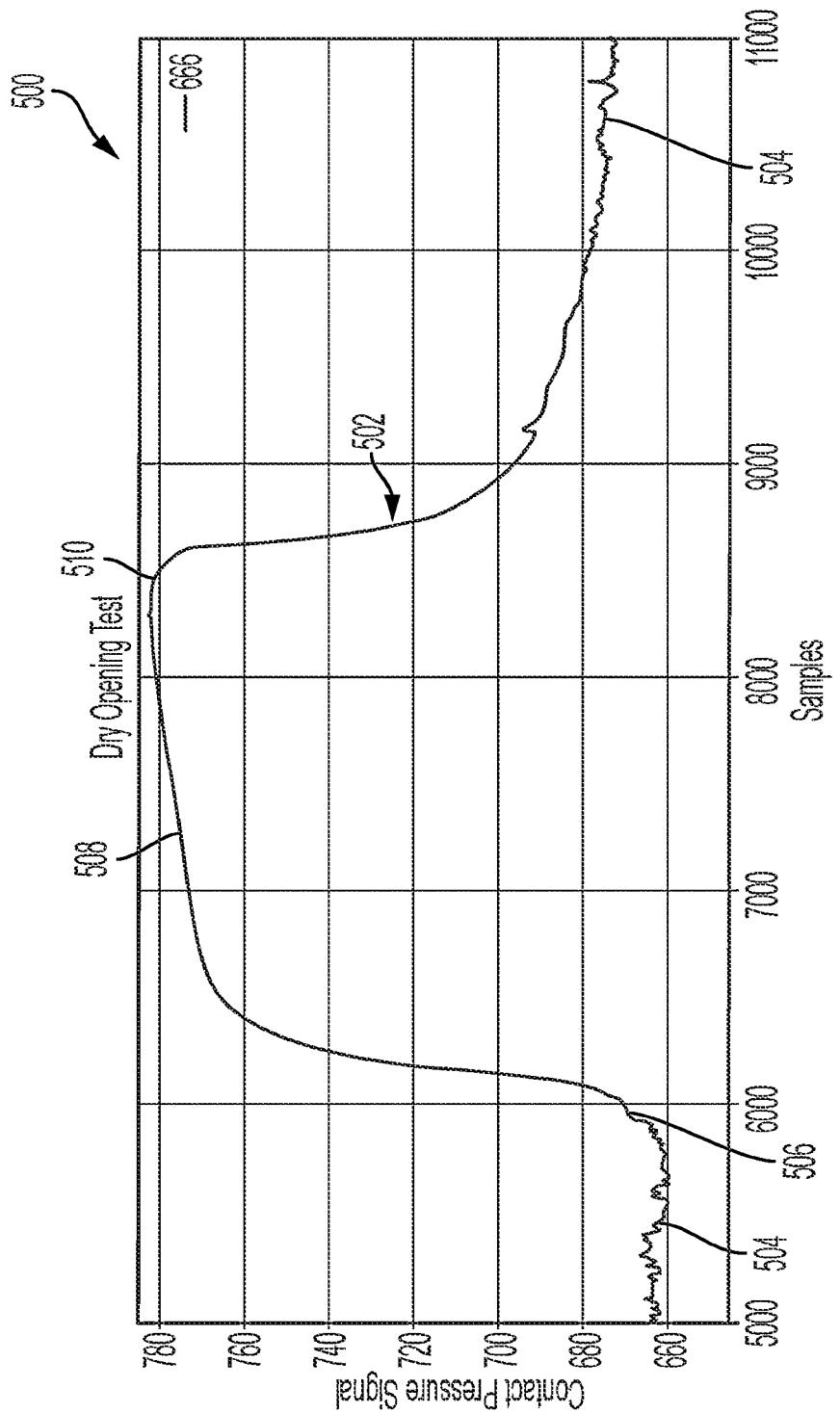
FIG. 5 is a graph illustrating dry opening testing of a contact sensor in a BFP system in accordance with the subject technology.

FIG. 5 illustrates a graph 500 illustrating a dry opening testing of a contact sensor such as shown in FIG. 3 in a BFP system in accordance with the subject technology. The graph 500 has the sensor signal on the vertical axis and samples over time on the horizontal axis. The sensor signal may be a measure of resistance. When opening from the closed position, the pressure on the contact sensor is released so that the resistance changes as indicated by the waveform 502 jumping upward from the baseline level 504 at point 506 to an elevated level 508. Upon closing to reapply pressure to the contact sensor, the resistance again changes so that the waveform 502 drops back down at point 510 to return to the closed baseline level 504. A controller receiving this signal can easily determine the position of the valve disc with respect to the valve seat.

Figure 6:
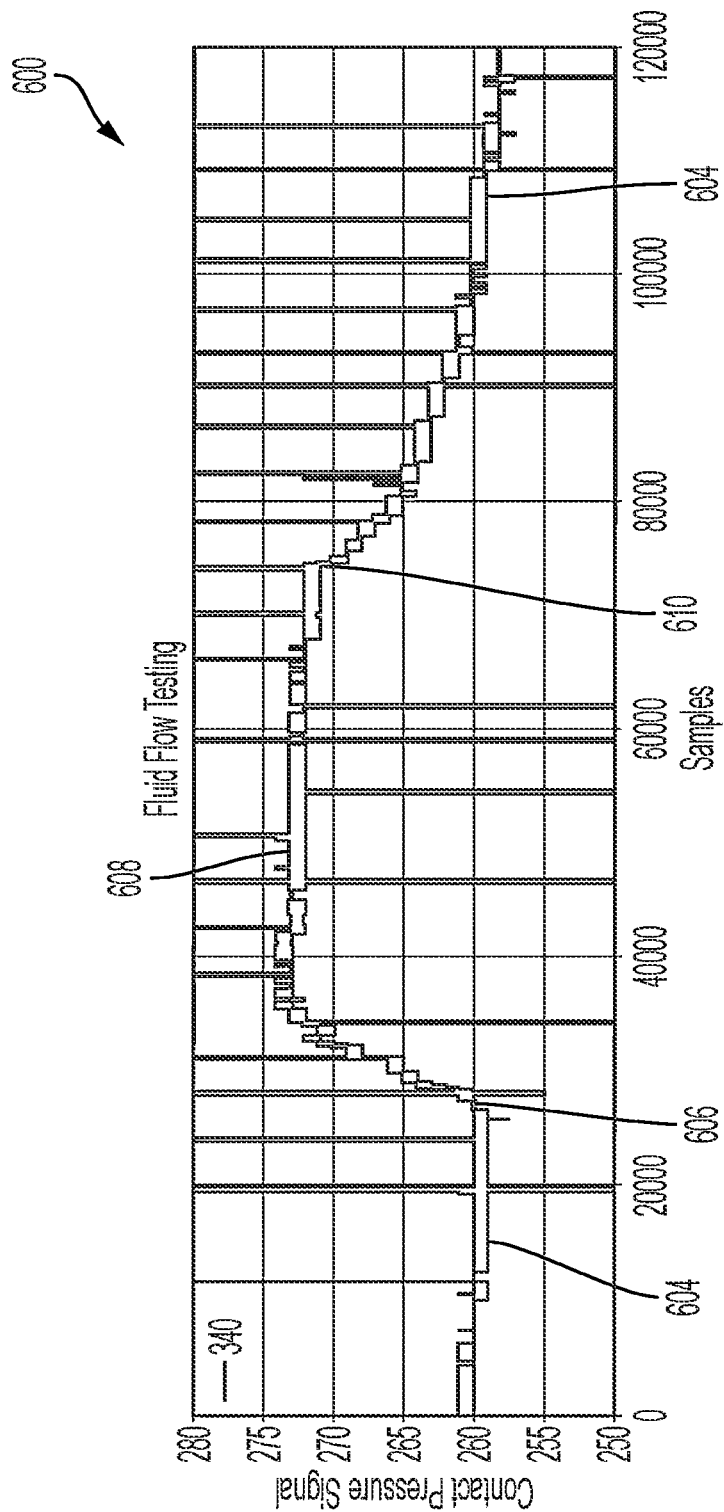
FIG. 6 is a graph illustrating fluid flow testing of a contact sensor in a BFP system in accordance with the subject technology.

FIG. 6 is another graph 600 illustrating fluid flow testing of a contact sensor such as shown in FIG. 3 in a BFP system in accordance with the subject technology. As can be seen, graph 600 includes the same rise in signal from baseline 604 at point 606 that corresponds to opening the check valve. Also, from the elevated level 608, the signal again drops at the point 610 of closing the check valve so that a controller can effectively monitor the position of the check valve as open or closed. As noted above, by recording the static pressure differences at the opening and closing of the check valves, the cracking and closing pressure of the check valves can be automatically monitored.

Figure 7:
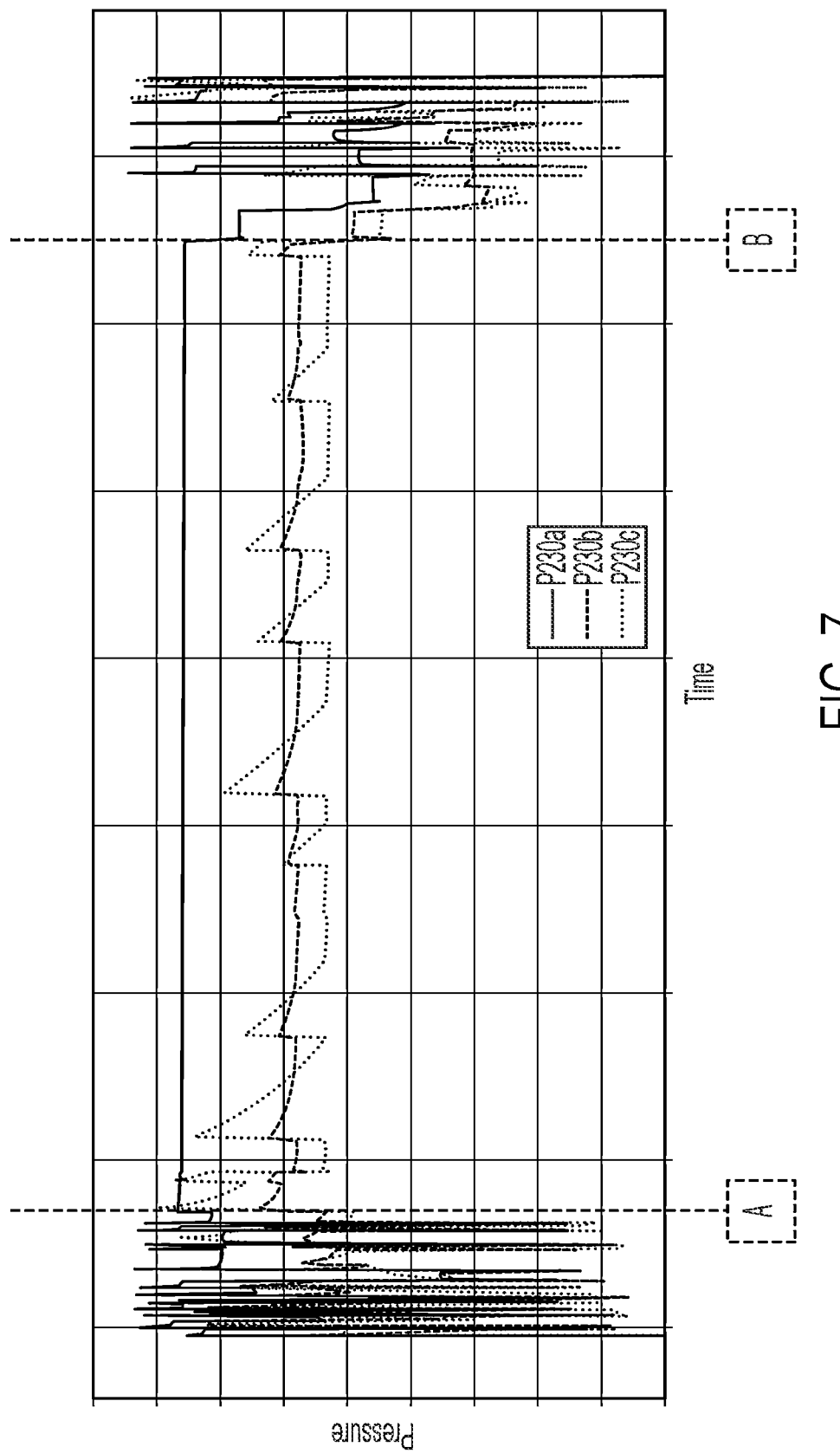
FIG. 7 is a graph of zone pressures versus time for a BFP system in accordance with the subject technology.

FIG. 7 is a graph showing an example of actual pressure measurements P230a, P230b, P230c over time, wherein P230a is measurement from the first pressure sensor 230a in the inlet pressure zone 222, P230b is measurement from the second pressure sensor 230b in the intermediate pressure zone 226, and P230c is measurement from the pressure sensor 230c in the outlet pressure zone 224. The area of graph between vertical lines A and B represent evening hours in a commercial building when the plumbing system is not in use and the first and the second check valve assemblies 210a, 210b are in closed positions according to the position sensors 232a, 232b.

As shown, the inlet pressure P230a, which is indicative of an upstream portion of the plumbing system, is constant, while the outlet pressure P230c, which is indicative of a downstream portion of the plumbing system, is not constant. It is presumed that the variations in the outlet pressure are due to temperature variations in the downstream portion of the plumbing system causing pressure fluctuations in the outlet. Nevertheless, what is interesting is that the pressure fluctuations in the outlet pressure zone 224 causes corresponding pressure fluctuations in the intermediate pressure zone 226.

It is thought that the pressure fluctuations in the intermediate pressure zone 226 are also dependent on the compression, or lack thereof, (i.e., stiffness) of the seals of the check valve assemblies 210a, 210b in closed positions. The pressure fluctuations, therefore, can be used to track and predict the conditions of the seals of the check valve assemblies 210a, 210b.

The pressure measurements P230a, P230b, P230c may be used independently of, or in cooperation with, the contact sensors 232a, 232b to monitor the condition of the check valve assemblies 210a, 210b and the downstream portion of the plumbing system.

Figure 8:
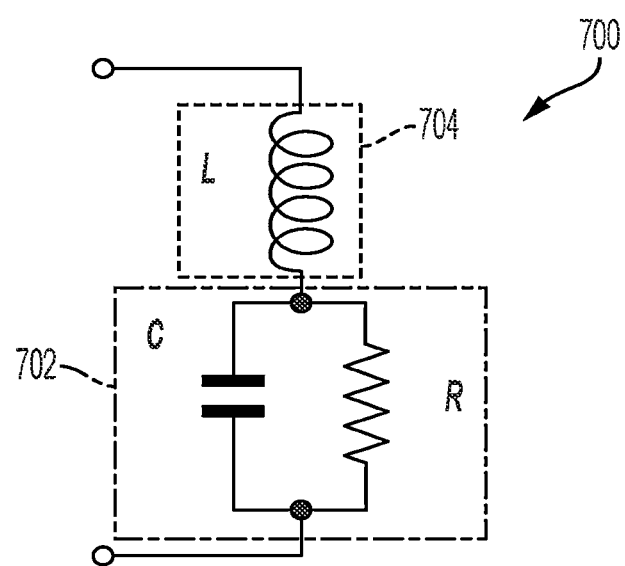
FIG. 8 is a schematic representation of another sensor using wireless technology for determining position of a check valve in accordance with the subject technology.

Referring now to FIG. 8, a schematic representation of another sensor 700 using wireless technology for determining position of a check valve in accordance with the subject technology is shown. The sensor 700 can again utilize a piezoresistive polymer composite portion 702, which also exhibits piezocapacitive properties. By integrating an inductor/antenna portion 704 into a valve disc composed of the piezoresistive polymer composite and coupling the inductor/antenna portion 704 to the piezoresistive polymer composite portion 702, the sensor signals can be monitored wirelessly without the need to route wires through the check valve. In one embodiment, the piezoresistive polymer composite is santoprene, which is an injection moldable thermoplastic elastomer (TPE) and, more particularly a thermoplastic vulcanizate (TPV). Other electroactive polymers may be used in place of the piezoresistive polymer.

Figure 9:
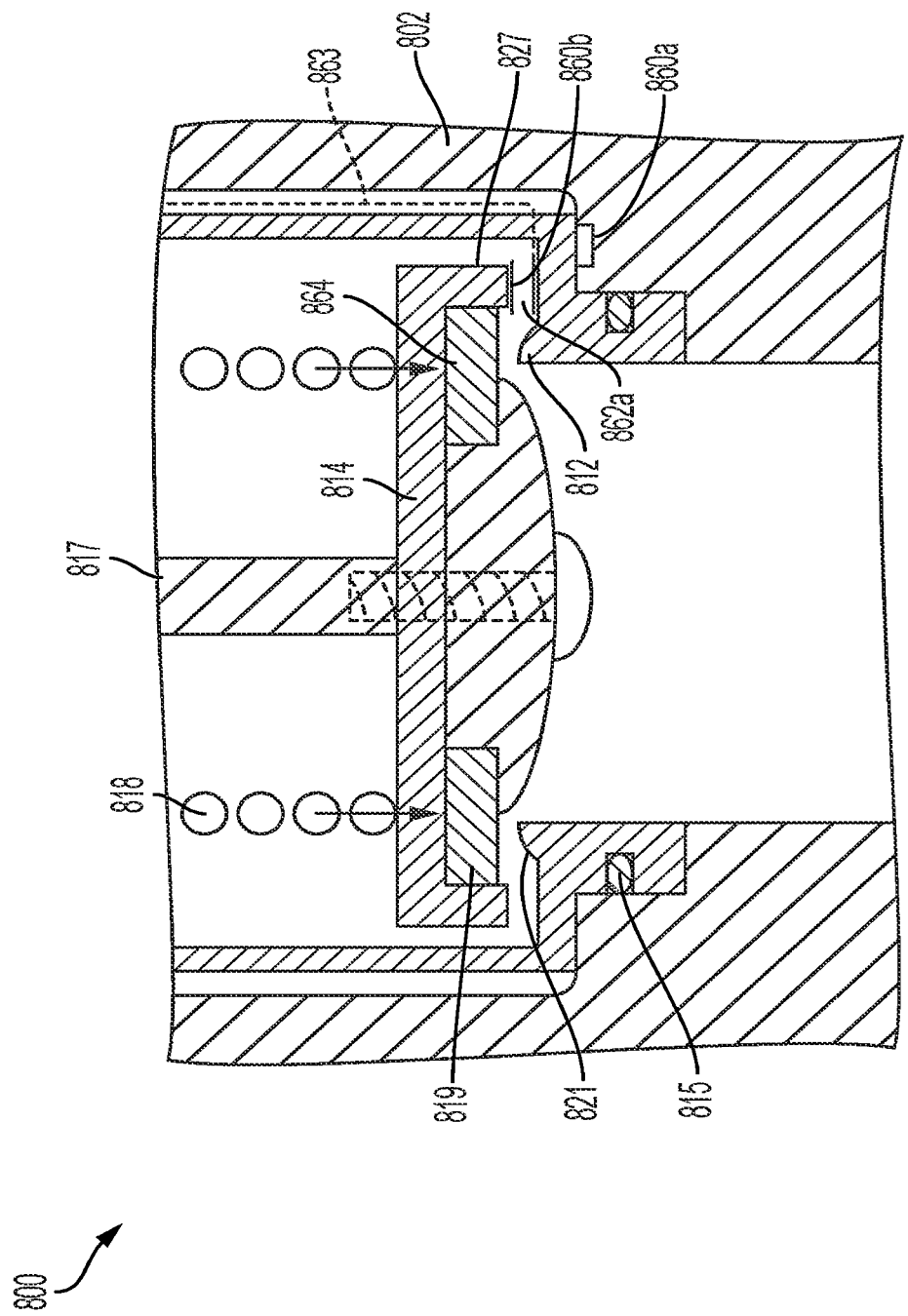
FIG. 9 is a cross-sectional view of another check valve for determining position of a check valve in accordance with the subject technology.

Referring now to FIG. 9, a cross-sectional view of another check valve 800 for determining position of a check valve in accordance with the subject technology is shown. The cross-sectional view is helpful to illustrate how various technology may be deployed in various locations to generate a signal indicative of the position of the check valve 800. The check valve 800 is not unlike the ones described above in that the check valve includes a valve disc 814 slidingly mounted in a housing 802 to seal against a valve seat 812 sealed in place with an o-ring 815. A valve stem 817 and bias spring 818 help to guide movement of the valve disc 814 and keep the check valve 800 in a normally closed position. The valve disc 814 includes a contact ring 819 that seals against an annular mating portion 821 of the valve seat 812. As noted above, any of these components may be integrally formed with a portion of a position sensor.

One embodiment of a sensor utilizes proximity or non-contact detection such as Hall effect, capacitive, Eddy current and Linear Variable Differential Transformer (LVDT) technology. Still referring to FIG. 9, one possible placement for a position sensor 860a is under the valve seat 812. As a depending shoulder 827 of the valve disc 814 moves into the closed position, the depending shoulder 827 creates pressure that can activate the sensor 860a. Alternatively or in addition, the depending shoulder 827 may carry a component 860b of the sensor such as a magnet thereon to activate a Hall effect component 860a. Also, with contact, the sensor 860a, component 860b, valve seat 812 and other necessary components may simply complete a circuit to indicate valid closing.

In another embodiment, the depending shoulder 827 carries a component 860b of the sensor that directly interacts with a complimentary component 862a on the valve seat 812. The complimentary component 862a is connected to a controller by wire 863. In this version, the components are arranged so that upon closing the of the check valve 800, the components 860b 862a interact such as by contact so that a signal is generated to indicate the closed position. Again, as noted above, a sensor component 864 may be assembled into the valve disk 814 behind the contact ring 819. Preferably, the sensor component 864 generates a closed signal in response to the closing pressure applied to the contact ring 819.

Still referring to FIG. 9, the o-ring 815 can also be configured to sense the position of the check valve 800 by having an integral pressure sensing element. Alternatively, various soft components can have switches embedded therein. For example, the annular sealing portion 821 can be flexible rubber with a switch embedded therein so that upon closing of the check valve 800, the switch is activated.

Figure 1B:
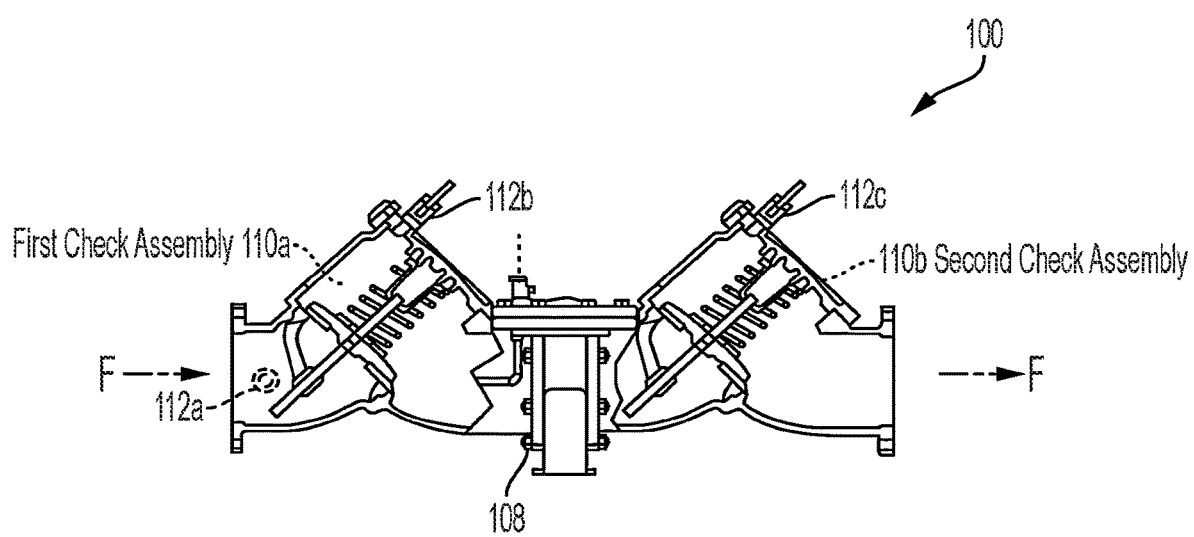

It is envisioned that the subject technology can be retrofit on to a wide variety of backflow prevention and related devices such as the prior art device 100 of FIG. 1. The test-cocks that come standard on most backflow preventers can be used to access the chamber pressure and route sensor wires into the BFP assembly. For example, the pressure sensors can be added by reconfiguring the housing while adding position sensors by reconfiguring or reworking the check valves. Additional examples are found in U.S. Provisional Patent Application No. 62/844,912 filed on May 8, 2019 entitled "Backflow Prevention System Test Cock with a Fluid Sensor" and U.S. Provisional Patent Application No. 62/869,195 filed on Jul. 1, 2019 entitled "Wireless Communication System within a Mechanical Room," each of which is incorporated herein by reference. The subject technology applies to any double check valve and reduced pressure backflow preventer.

The subject technology, therefore, provides contact sensors 232*a*, 232*b* for monitoring whether the check valves in a backflow prevention valve assembly are open or closed, so that the cracking pressure and any leakage can be tracked with the pressure sensors 230*a-c*. Cracking pressure is a regulated value for BFP check valve performance. Measuring the pressure difference at the instant that the valves open or close will provide direct continuous monitoring of that value over time.

Furthermore, if both check valves are closed, changes in the intermediate pressure zone indicates that at least one check valve is leaking. Monitoring the intermediate pressure zone over time may indicate the condition of the valve seals/gaskets and allow the prediction future failures. The pressure sensors 230*a-c* can also be used to track the condition of the connected plumbing system. For example, pressure fluctuations in the outlet pressure zone 224 may be used to detect water leaks in the downstream plumbing system.

It will be appreciated by those of ordinary skill in the pertinent art that the functions of several elements may, in alternative embodiments, be carried out by fewer elements, or a single element. Similarly, in some embodiments, any functional element may perform fewer, or different, operations than those described with respect to the illustrated embodiment. Also, functional elements (e.g., check valves, shut-off valves, and the like) shown as distinct for purposes of illustration may be incorporated within other functional elements in a particular implementation.

While the subject technology has been described with respect to various embodiments, those skilled in the art will readily appreciate that various changes and/or modifications can be made to the subject technology without departing from the scope of the present disclosure.

The invention claimed is:

1. A backflow preventer for preventing a reverse flow of water in a plumbing system, comprising:
a body having an inlet for connection to an upstream portion of the plumbing system and an outlet for connection to a downstream portion of the plumbing system;
a first check valve and a second check valve located in the body for preventing the reverse flow of water between the outlet and the inlet;
an inlet pressure zone positioned in the body between the inlet and the first check valve;
an outlet pressure zone positioned in the body between the outlet and the second check valve;
an intermediate pressure zone positioned in the body between the first and the second check valves;
an intermediate pressure sensor located in the intermediate pressure zone;
a controller in communication with the intermediate pressure sensor,
wherein the controller is configured to generate a leak error signal if pressure in the intermediate pressure zone changes while both check valves are in a closed position.

2. The backflow preventer of claim 1, further comprising: a first position sensor for determining a position of the first check valve; a second position sensor for determining a position of the second check valve; an inlet pressure sensor located in the inlet pressure zone; and an outlet pressure sensor located in the outlet pressure zone, wherein and the controller is in communication with the sensors, the inlet pressure sensor and the outlet pressure sensor and configured to generate a leak error signal if pressure in the one of the pressure zones changes while both check valves are in the closed position.

3. The backflow preventer of claim 2, wherein the controller determines a cracking pressure for each check valve upon opening based upon communications received from the position sensors and the pressure sensors.

4. The backflow preventer of claim 3, wherein the controller generates an error signal if either cracking pressure is outside a predetermined range.

5. The backflow preventer of claim 3, wherein the cracking pressure of the first check valve is equal to a difference between the inlet pressure sensor and the intermediate pressure sensor when the first position sensor detects the first check valve moves from the closed position to an open position.

6. The backflow preventer of claim 2, wherein the controller determines a closing pressure for each check valve based upon based upon communications received from the position sensors and the pressure sensors and the closing pressure of the second check valve is equal to a difference between the inlet pressure sensor and the intermediate pressure sensor when the second position sensor detects the second check valve moves from the open position to the closed position.

7. The backflow preventer of claim 2, wherein the controller monitors stiffness of seals of the check valves based upon communications received from the intermediate pressure sensor when the position sensors communicate that the check valves are both in the closed position.

8. The backflow preventer of claim 2, wherein:
the first check valve includes a valve seat and a slidably mounted valve disc for sealingly engaging the valve seat to close the first check valve; and
the first position sensor includes a sensor lead having a piezoresistive composite ring sandwiched between two current collector rings, the sensor lead being coupled to the valve seat so that upon closing, pressure from the valve disc transmitted to the sensor lead actuates the first position sensor.

9. The backflow preventer of claim 1, further comprising a relief valve assembly located between the check valves.

10. A system for monitoring a backflow preventer valve assembly, comprising:
a first position sensor for determining a position of a first check valve of the backflow preventer valve assembly;
a second position sensor for determining a position of a second check valve of the backflow preventer valve assembly;
a pressure sensor for determining pressure between the check valves; and
a controller in communication with the position sensors and the pressure sensor,
wherein the controller generates a leak error signal if the pressure sensor indicates a change in pressure between the check valves while the position sensors indicate that both check valves are in a closed position.

11. A system as recited in claim 10, further comprising:
an outlet pressure sensor for determining pressure at an outlet of the backflow preventer valve assembly; and
an inlet pressure sensor for determining pressure at an inlet of the backflow preventer valve assembly.

12. A system as recited in claim 10, wherein the controller determines a cracking pressure for each check valve based upon signals from the position sensors and the pressure sensor.

13. A system as recited in claim 12, wherein the controller generates an error signal if either cracking pressure is outside a predetermined range.

14. A system as recited in claim 10, wherein the first position sensor includes a sensor lead having a piezoresistive composite ring sandwiched between two current collector rings.

15. A system as recited in claim 10, wherein the controller monitors stiffness of seals of the check valves based upon communications received from the pressure sensor when the position sensors communicate that the check valves are both in a closed position.

16. A system as recited in claim 10, wherein the controller detects leaks in a downstream portion of a plumbing system connected to an outlet of the assembly based upon communications received from the pressure sensor and the position sensors.

\* \* \* \* \*